United States Patent
Caporaletti et al.

(10) Patent No.: US 10,051,330 B2
(45) Date of Patent: Aug. 14, 2018

(54) VIRTUAL REALITY STREAMING FOR GAMES

(71) Applicant: Facebook, Inc., Menlo Park, CA (US)

(72) Inventors: Brendan Si-jing Caporaletti, Pleasanton, CA (US); Christopher John Marra, San Francisco, CA (US); Joshua R. Langowitz, Cambridge, MA (US); William Dean Saulnier, Seattle, WA (US); Chu-Hao Fan, San Francisco, CA (US); Thomas Nattestad, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/406,197

(22) Filed: Jan. 13, 2017

(65) Prior Publication Data

US 2018/0205996 A1    Jul. 19, 2018

(51) Int. Cl.
| | |
|---|---|
| *H04N 21/27* | (2011.01) |
| *H04N 21/274* | (2011.01) |
| *H04N 21/2743* | (2011.01) |
| *H04N 21/278* | (2011.01) |
| *H04N 21/478* | (2011.01) |
| *H04N 21/8545* | (2011.01) |
| *H04N 21/81* | (2011.01) |
| *H04N 21/433* | (2011.01) |
| *H04N 21/482* | (2011.01) |
| *H04N 21/4402* | (2011.01) |
| *G06F 3/01* | (2006.01) |
| *A63F 13/211* | (2014.01) |
| *A63F 13/428* | (2014.01) |
| *A63F 13/525* | (2014.01) |

(52) U.S. Cl.
CPC ....... *H04N 21/4781* (2013.01); *A63F 13/211* (2014.09); *A63F 13/428* (2014.09); *A63F 13/525* (2014.09); *G06F 3/012* (2013.01); *H04N 21/4334* (2013.01); *H04N 21/4402* (2013.01); *H04N 21/482* (2013.01); *H04N 21/8146* (2013.01); *H04N 21/8545* (2013.01); *A63F 2300/8082* (2013.01)

(58) Field of Classification Search
CPC .. H04N 21/27; H04N 21/274; H04N 21/2743; H04N 21/278
USPC ........................................................ 725/133
See application file for complete search history.

(56) References Cited

U.S. PATENT DOCUMENTS

2016/0027143 A1*  1/2016  Amidei ..................... G06T 1/20
                                                            345/522

* cited by examiner

*Primary Examiner* — Dominic D Saltarelli
(74) *Attorney, Agent, or Firm* — Fenwick & West LLP

(57) ABSTRACT

Embodiments relate to providing a recorded gameplay session of an interactive content controlled by a broadcasting user. While the broadcasting user is controlling the interactive content being recorded, the inputs provided by the broadcasting user for interacting with the interactive content are recorded. Properties of objects in the interactive content being controlled by the broadcasting user are modified in view of the inputs provided by the broadcasting user. Furthermore, the properties of the objects in the interactive content being controlled by the broadcasting user are periodically recorded. The recorded inputs provided by the broadcasting user and the recorded properties of the objects in the interactive content are used to provide a viewing user a recording of the gameplay session of the interactive content controlled by the broadcasting user.

20 Claims, 7 Drawing Sheets

Broadcasting User View

Viewing User View

VIRTUAL REALITY STREAMING FOR GAMES

BACKGROUND

Field of Art

The present disclosure generally relates to spectating a virtual reality or an augmented reality interactive content.

Description of the Related Art

Virtual reality (VR) or augmented reality (AR) interactive content produces compelling and immersive experiences by simulating a user's physical presence in a real or a virtual environment. For example, some VR/AR games allow users to look around the environment and change the perspective or field of view being displayed by rotating the user's head.

Game spectators watch gameplay sessions for different reasons. For example, some spectators watch game gameplay sessions to learn how to play the game or to experience the game before purchasing it. Conventionally, spectators watch videos of the gameplay session that as it was rendered during the game play of the user broadcasting the gameplay session. As such, when spectating a VR/AR interactive content, the spectator would not be able to control the perspective or the field of view of the interactive content, because the view used to spectate the VR/AR interactive content was rendered by the broadcasting user based on the perspective and field of view used by the broadcasting user.

This creates a less immersive experience for the spectating user even if the spectating user is using a VR/AR headset to spectate the VR/AR interactive content. Furthermore, since the movement of the field of view does not match the movement of the spectating user's head, the spectating user may experience some discomfort such as headaches, nausea, fatigue, drowsiness, or disorientation.

SUMMARY

Embodiments relate to providing a recorded gameplay session of an interactive content controlled by a broadcasting user. While the broadcasting user is controlling the interactive content being recorded, the inputs provided by the broadcasting user for interacting with the interactive content are recorded. Properties of objects in the interactive content being controlled by the broadcasting user are modified in view of the inputs provided by the broadcasting user. Furthermore, the properties of the objects in the interactive content being controlled by the broadcasting user are periodically recorded. The recorded inputs provided by the broadcasting user and the recorded properties of the objects in the interactive content are used to provide a viewing user a recording of the gameplay session of the interactive content controlled by the broadcasting user.

In some embodiments, the recorded inputs provided by the broadcasting user and the recorded properties of the objects in the interactive content are used to generate a 360° video. The interactive content is replayed based on the stored input and the objects in the replay of the interactive content are periodically modified based on the stored properties of the objects. The 360° video is then generated by rendering images from a plurality of views.

In some embodiments, the recorded inputs provided by the broadcasting user and the recorded properties of the objects in the interactive content are provided to a viewing user. A client device of the viewing user can then replay the interactive content based on the received recorded inputs and render a set of images or a video for viewing by the viewing user. In these embodiments, the viewing user may provide an input to control the view used to render the set of images or video.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
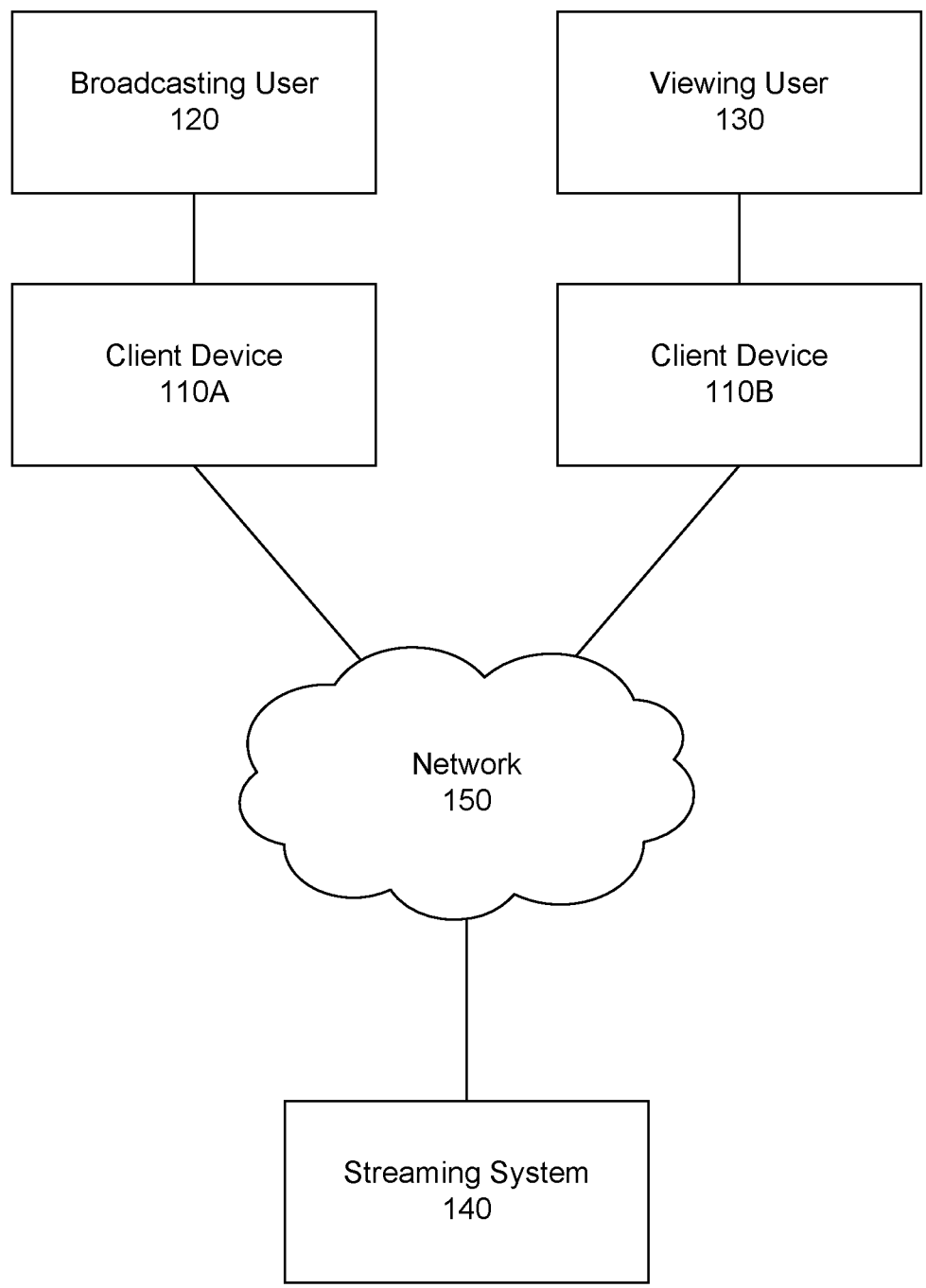
FIG. 1 illustrates a block diagram of a system environment for a VR/AR game streaming system, according to one embodiment.

FIG. 1 illustrates a block diagram of a system environment 100 for a VR/AR game streaming system, according to one embodiment. The system environment 100 shown by FIG. 1 comprises one or more client devices 110, a broadcasting user 120, a viewing user 130, a streaming system 140, and a network 150. In alternative configurations, different and/or additional components may be included in the system environment 100.

The client devices 110 are one or more computing devices capable of receiving user input as well as transmitting and/or receiving data via the network 150. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 150. In one embodiment, a client device 110 executes an application allowing a user of the client device 110 to interact with the online system 140. For example, a client device 110 executes a browser application to enable interaction between the client device 110 and the online system 140 via the network 150. In another embodiment, a client device 110 interacts with the online system 140 through an application programming interface (API) running on a native operating system of the client device 110, such as IOS® or ANDROID™.

Figure 2:
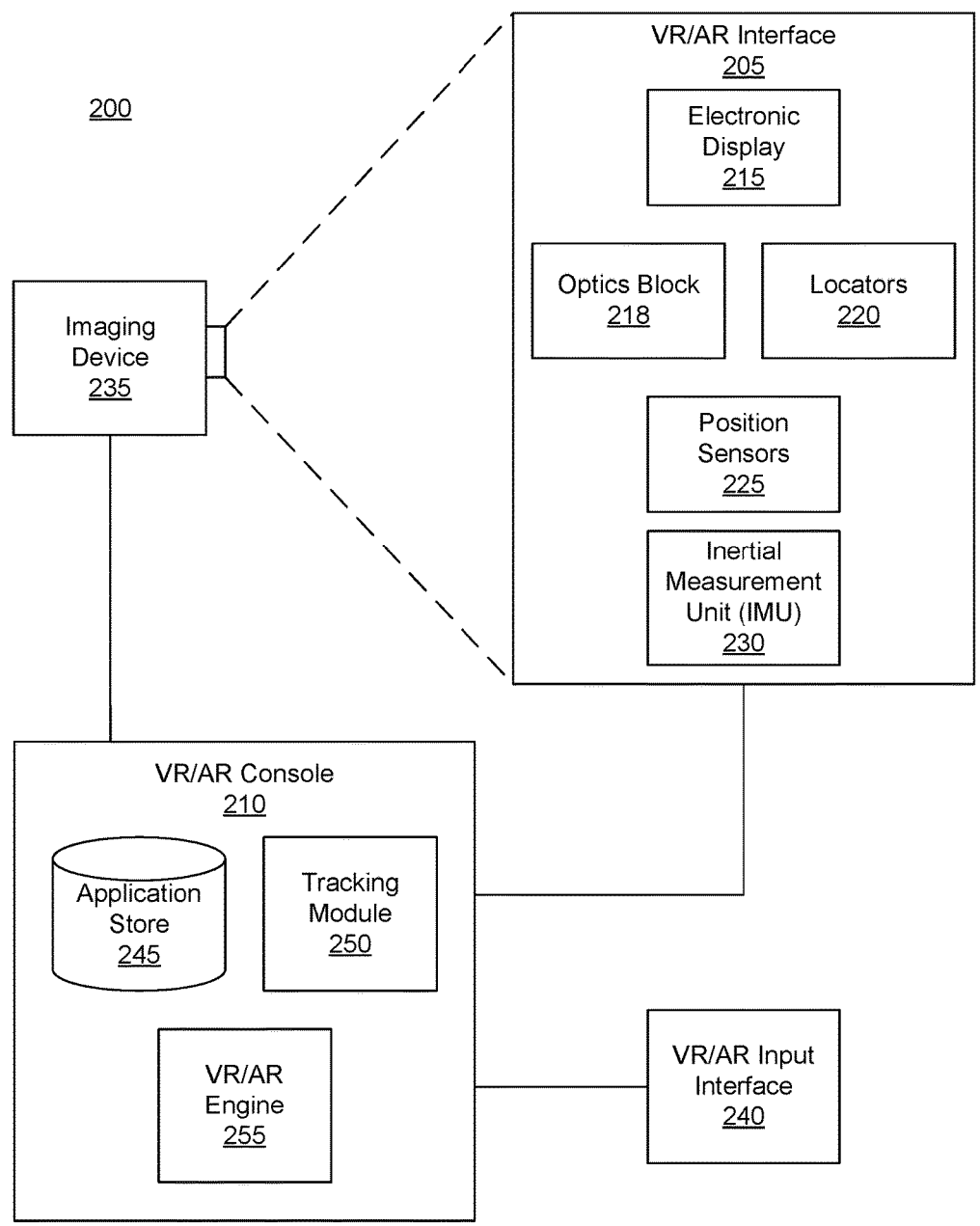
FIG. 2 is a block diagram of a VR/AR system, according to one embodiment.

Broadcasting user 120 uses client device 110 to run a VR/AR application (e.g., a virtual reality game). For example, a smartphone that includes multiple accelerometers and gyroscopes can be used to play a virtual reality game. In another example, a user may use a client device attached to a virtual reality headset to play the virtual reality game. FIG. 2 shows an example virtual reality system that can be used to interact with virtual reality content.

The broadcasting user 120 further uses the client device 110A to record a session of the VR/AR application and transmit the recording to the streaming system 140. For instance, a session of a VR/AR application can be a playthough of a virtual reality game played by the broadcasting user 120 or a portion of a gameplay of the virtual reality game played by the broadcasting user 120. In some embodiments, the broadcasting user 120 interacts with the client device 110A via a VR/AR headset. In other embodiments, the client device 110A is a handheld device (e.g., a smartphone) and the broadcasting user may directly interact with the client device 110A via input provided by or embedded in the handheld device.

The viewing user 130 uses client device 110B to request a recording of a session of a virtual reality application from the streaming system 140. Thus, the viewing user 130 can spectate a session of the virtual reality application provided by a broadcasting user 120. In one embodiment, the viewing user 130 interacts with the client device 110B using a VR/AR headset. In other embodiments, the viewing user 130 may use a handheld device. In yet other embodiments, the viewing user 130 may use a client device that does not have VR/AR capabilities. In this embodiment, the user may use a controller (e.g., a joystick) or a pointing device (e.g., a mouse) to interact with the client device 110B. In other words, the viewing user 130 may change the field of view of the content using a joystick instead of turning their head with a VR/AR headset.

The client devices 110 are configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

FIG. 2 is a block diagram of a VR/AR system 200, according to one embodiment. The VR/AR system 200 shown by FIG. 1 comprises a VR/AR interface 205 (e.g., a VR/AR headset), an imaging device 235, and a VR/AR input interface 240 that are each coupled to the VR/AR console 210. While FIG. 2 shows an example system 200 including one VR/AR interface 205, one imaging device 235, and one VR/AR input interface 240, in other embodiments any number of these components may be included in the VR/AR system 200. For example, there may be multiple VR/AR interfaces 105 each having an associated VR/AR input interface 240 and being monitored by one or more imaging devices 235, with each VR/AR interface 205, VR/AR input interface 240, and imaging devices 235 communicating with the VR/AR console 210. In alternative configurations, different and/or additional components may be included in the VR/AR system 200.

The VR/AR interface 205 is a head-mounted display that presents media to a user. Examples of media presented by the VR/AR head set include one or more images, video, audio, or some combination thereof. In some embodiments, audio is presented via an external device (e.g., speakers and/or headphones) that receives audio information from the VR/AR interface 205, the VR/AR console 210, or both, and presents audio data based on the audio information. An embodiment of the VR/AR interface 205 is further described below in conjunction with FIGS. 3A and 3B. The VR/AR interface 205 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR/AR interface 205 includes an electronic display 215, an optics block 218, one or more locators 220, one or more position sensors 225, and an inertial measurement unit (IMU) 230. The electronic display 215 displays images to the user in accordance with data received from the VR/AR console 210. In various embodiments, the electronic display 215 may comprise a single electronic display or multiple electronic displays (e.g., an electronic display for each eye of a user). The electronic display 215 may be a liquid crystal display (LCD) or an organic light-emitting diode (OLED) as described in detail with respect to FIG. 3 below.

The optics block 218 magnifies received light from the electronic display 215, corrects optical errors associated with the image light, and the corrected image light is presented to a user of the VR/AR interface 205. An optical element may be an aperture, a Fresnel lens, a convex lens, a concave lens, a filter, or any other suitable optical element that affects the image light emitted from the electronic display 215. Moreover, the optics block 218 may include combinations of different optical elements. In some embodiments, one or more of the optical elements in the optics block 218 may have one or more coatings, such as anti-reflective coatings.

Magnification of the image light by the optics block 218 allows the electronic display 215 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 218 is designed so its effective focal length is larger than the spacing to the electronic display 215, which magnifies the image light projected by the electronic display 215. Additionally, in some embodiments, the amount of magnification may be adjusted by adding or removing optical elements.

The optics block 218 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 215 for display is pre-distorted, and the optics block 218 corrects the distortion when it receives image light from the electronic display 215 generated based on the content.

The locators 220 are objects located in specific positions on the VR/AR interface 205 relative to one another and relative to a specific reference point on the VR/AR interface 205. A locator 220 may be a light emitting diode (LED), a corner cube reflector, a reflective marker, a type of light source that contrasts with an environment in which the VR/AR interface 205 operates, or some combination thereof. In embodiments where the locators 220 are active (i.e., an LED or other type of light emitting device), the locators 220 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 220 are located beneath an outer surface of the VR/AR interface 205, which is transparent to the wavelengths of light emitted or reflected by the locators 220 or is thin enough not to substantially attenuate the wavelengths of light emitted or reflected by the locators 220. Additionally, in some embodiments, the outer surface or other portions of the VR/AR interface 205 are opaque in the visible band of wavelengths of light. Thus, the locators 220 may emit light in the IR band under an outer surface that is transparent in the IR band but opaque in the visible band.

The IMU 230 is an electronic device that generates fast calibration data based on measurement signals received from one or more of the position sensors 225. A position sensor 225 generates one or more measurement signals in response to motion of the VR/AR interface 205. Examples of position sensors 225 include: one or more accelerometers, one or more gyroscopes, one or more magnetometers, another suitable type of sensor that detects motion, a type of sensor used for error correction of the IMU 230, or some combination thereof. The position sensors 225 may be located external to the IMU 230, internal to the IMU 230, or some combination thereof.

Based on the one or more measurement signals from one or more position sensors 225, the IMU 230 generates fast calibration data indicating an estimated position of the VR/AR interface 205 relative to an initial position of the VR/AR interface 205. For example, the position sensors 225 include multiple accelerometers to measure translational motion (forward/back, up/down, left/right) and multiple gyroscopes to measure rotational motion (e.g., pitch, yaw, roll). In some embodiments, the IMU 230 rapidly samples the measurement signals and calculates the estimated position of the VR/AR interface 205 from the sampled data. For example, the IMU 230 integrates the measurement signals received from the accelerometers over time to estimate a velocity vector and integrates the velocity vector over time to determine an estimated position of a reference point on the VR/AR interface 205. Alternatively, the IMU 230 provides the sampled measurement signals to the VR/AR console 210, which determines the fast calibration data. The reference point is a point that may be used to describe the position of the VR/AR interface 205. While the reference point may generally be defined as a point in space; however, in practice the reference point is defined as a point within the VR/AR interface 205 (e.g., a center of the IMU 230).

The IMU 230 receives one or more calibration parameters from the VR/AR console 210. As further discussed below, the one or more calibration parameters are used to maintain tracking of the VR/AR interface 205. Based on a received calibration parameter, the IMU 230 may adjust one or more IMU parameters (e.g., sample rate). In some embodiments, certain calibration parameters cause the IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 235 generates slow calibration data in accordance with calibration parameters received from the VR/AR console 210. Slow calibration data includes one or more images showing observed positions of the locators 220 that are detectable by the imaging device 235. The imaging device 235 may include one or more cameras, one or more video cameras, any other device capable of capturing images including one or more of the locators 220, or some combination thereof. Additionally, the imaging device 235 may include one or more filters (e.g., used to increase signal to noise ratio). The imaging device 235 is configured to detect light emitted or reflected from locators 220 in a field of view of the imaging device 235. In embodiments where the locators 220 include passive elements (e.g., a retroreflector), the imaging device 235 may include a light source that illuminates some or all of the locators 220, which retro-reflect the light towards the light source in the imaging device 235. Slow calibration data is communicated from the imaging device 235 to the VR/AR console 210, and the imaging device 235 receives one or more calibration parameters from the VR/AR console 210 to adjust one or more imaging parameters (e.g., focal length, focus, frame rate, ISO, sensor temperature, shutter speed, aperture, etc.).

The VR/AR input interface 240 is a device that allows a user to send action requests to the VR/AR console 210. An action request is a request to perform a particular action. For example, an action request may be to start or end an application or to perform a particular action within the application. The VR/AR input interface 240 may include one or more input devices. Example input devices include: a keyboard, a mouse, a game controller, or any other suitable device for receiving action requests and communicating the received action requests to the VR/AR console 210. An action request received by the VR/AR input interface 240 is communicated to the VR/AR console 210, which performs an action corresponding to the action request. In some embodiments, the VR/AR input interface 240 may provide haptic feedback to the user in accordance with instructions received from the VR/AR console 210. For example, haptic feedback is provided when an action request is received, or the VR/AR console 210 communicates instructions to the VR/AR input interface 240 causing the VR/AR input interface 240 to generate haptic feedback when the VR/AR console 210 performs an action.

The VR/AR console 210 provides media to the VR/AR interface 205 for presentation to the user in accordance with information received from one or more of: the imaging device 235, the VR/AR interface 205, and the VR/AR input interface 240. In the example shown in FIG. 2, the VR/AR console 210 includes an application store 245, a tracking module 250, and a VR/AR engine 255. Some embodiments of the VR/AR console 210 have different modules than those described in conjunction with FIG. 2. Similarly, the functions further described below may be distributed among components of the VR/AR console 210 in a different manner than is described here.

The application store 245 stores one or more applications for execution by the VR/AR console 210. An application is a group of instructions, that when executed by a processor, generates content for presentation to the user. Content generated by an application may be in response to inputs received from the user via movement of the VR/AR interface 205 or the VR/AR input interface 240. Examples of applications include: gaming applications, conferencing applications, video playback application, or other suitable applications.

The tracking module 250 calibrates the VR/AR system 200 using one or more calibration parameters and may adjust one or more calibration parameters to reduce error in determination of the position of the VR/AR interface 205. For example, the tracking module 250 adjusts the focus of the imaging device 235 to obtain a more accurate position for observed locators on the VR/AR interface 205. Moreover, calibration performed by the tracking module 250 also accounts for information received from the IMU 230. Additionally, if tracking of the VR/AR interface 205 is lost (e.g., the imaging device 235 loses line of sight of at least a threshold number of the locators 220), the tracking module 250 re-calibrates some or all of the VR/AR system 200.

The tracking module 250 tracks movements of the VR/AR interface 205 using slow calibration information from the imaging device 235. The tracking module 250 determines positions of a reference point of the VR/AR interface 205 using observed locators from the slow calibration information and a model of the VR/AR interface 205. The tracking module 250 also determines positions of a reference point of the VR/AR interface 205 using position information from the fast calibration information. Additionally, in some embodiments, the tracking module 250 may use portions of the fast calibration information, the slow calibration information, or some combination thereof, to predict a future location of the interface 205. The tracking module 250 provides the estimated or predicted future position of the VR/AR interface 205 to the VR/AR engine 255.

The VR/AR engine 255 executes applications within the VR/AR system 200 and receives position information, acceleration information, velocity information, predicted future positions, or some combination thereof of the VR/AR interface 205 from the tracking module 250. Based on the received information, the VR/AR engine 255 determines content to provide to the VR/AR interface 205 for presentation to the user. For example, if the received information indicates that the user has looked to the left, the VR/AR engine 255 generates content for the VR/AR interface 205 that mirrors the user's movement in a virtual environment. Additionally, the VR/AR engine 255 performs an action within an application executing on the VR/AR console 210 in response to an action request received from the VR/AR input interface 240 and provides feedback to the user that the action was performed. The provided feedback may be visual or audible feedback via the VR/AR interface 205 or haptic feedback via the VR/AR input interface 240.

Figure 3A:
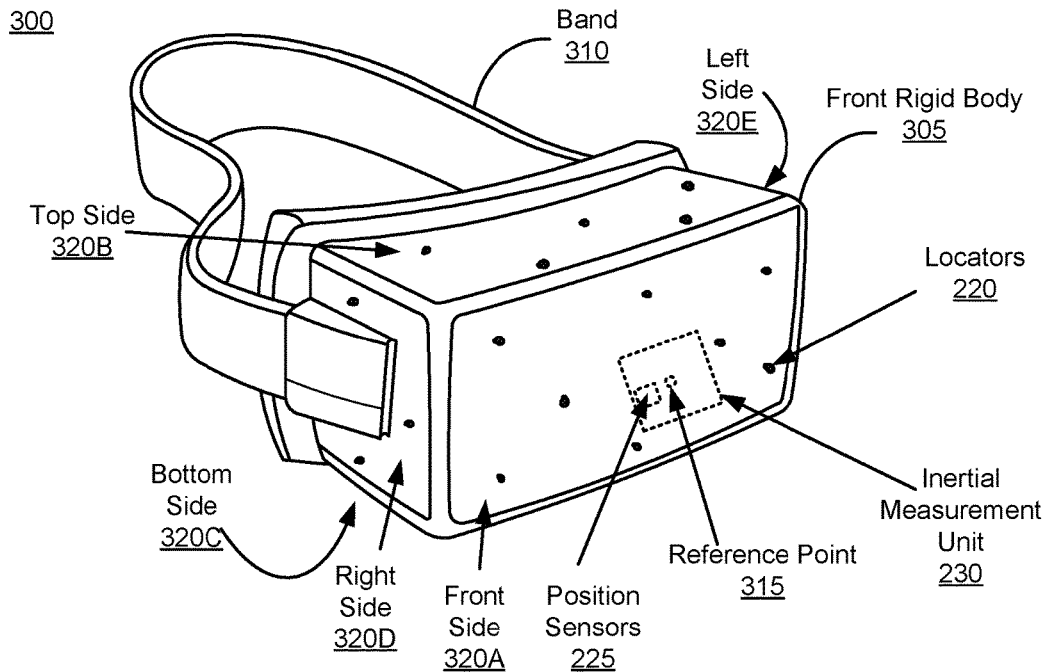
FIG. 3A is a diagram of a VR/AR headset, according to one embodiment.

FIG. 3A is a diagram of a VR/AR headset, according to one embodiment. The VR/AR headset 300 is an embodiment of the VR/AR interface 205, and includes a front rigid body 305 and a band 310. The front rigid body 305 includes an electronic display 215, the IMU 230, the one or more position sensors 225, and the locators 220. In the embodiment shown by FIG. 3A, the position sensors 225 are located within the IMU 230, and neither the IMU 230 nor the position sensors 225 are visible to the user.

The locators 220 are located in fixed positions on the front rigid body 305 relative to one another and relative to a reference point 315. In the example of FIG. 3A, the reference point 315 is located at the center of the IMU 230. Each of the locators 220 emit light that is detectable by the imaging device 235. Locators 220, or portions of locators 220, are located on a front side 320A, a top side 320B, a bottom side 320C, a right side 320D, and a left side 320E of the front rigid body 305 in the example of FIG. 3A.

Figure 3B:
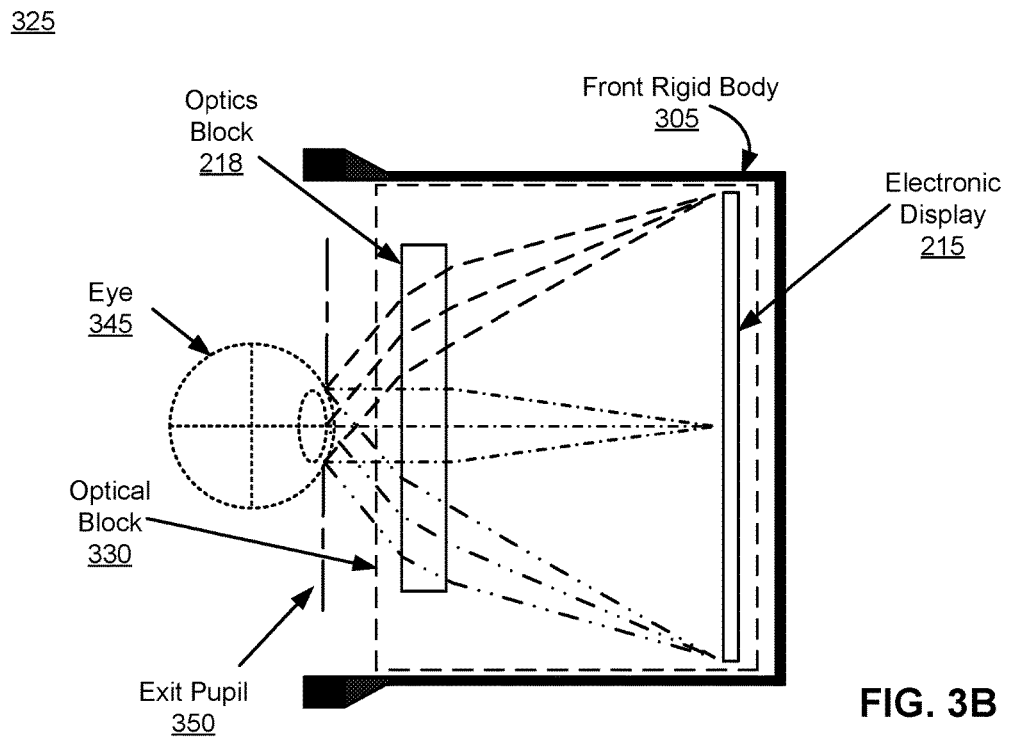
FIG. 3B is a cross section of a front rigid body of the VR/AR headset in FIG. 3A, according to one embodiment.

FIG. 3B is a cross section 325 of the front rigid body 305 of the embodiment of a VR/AR headset 300 shown in FIG. 3A. As shown in FIG. 3B, the front rigid body 305 includes an optical block 330 that provides altered image light to an exit pupil 350. The exit pupil 350 is the location of the front rigid body 305 where a user's eye 345 is positioned. For purposes of illustration, FIG. 3B shows a cross section 325 associated with a single eye 345, but another optical block, separate from the optical block 330, provides altered image light to another eye of the user.

The optical block 330 includes an electronic display 215, and the optics block 218. The electronic display 215 emits image light toward the optics block 218. The optics block 218 magnifies the image light, and in some embodiments, also corrects for one or more additional optical errors (e.g., distortion, astigmatism, etc.). The optics block 218 directs the image light to the exit pupil 350 for presentation to the user.

Figure 4A:
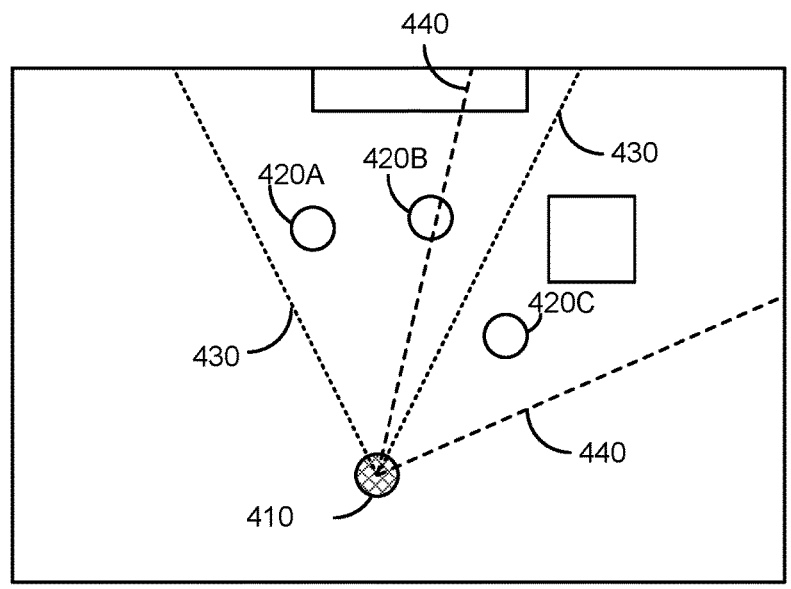
FIG. 4A illustrates a top view of an example scene of a game.
Figure 4B:
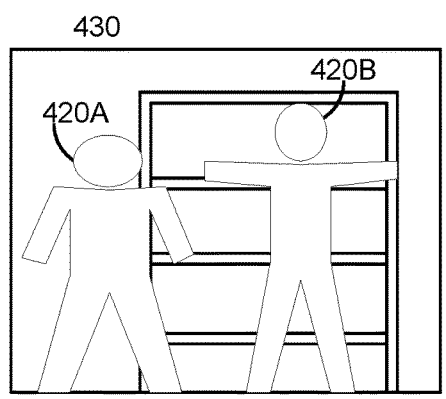
FIG. 4B illustrates an example view of a game as seen by a broadcasting user.

FIG. 4A illustrates a top view of an example scene of a game. The scene includes a player character 410 and multiple non-player characters (NPC) 420. The broadcasting user 120 views the game though field of view 430. FIG. 4B illustrates an example view of a game as seen by a broadcasting user 120. The field of view of the broadcasting user 120 includes first NPC 420A and second NPC 420B. A viewing user may want to view the game using a different field of view. For instance, a viewing user may want to view the game using field of view 440.

Figure 4C:
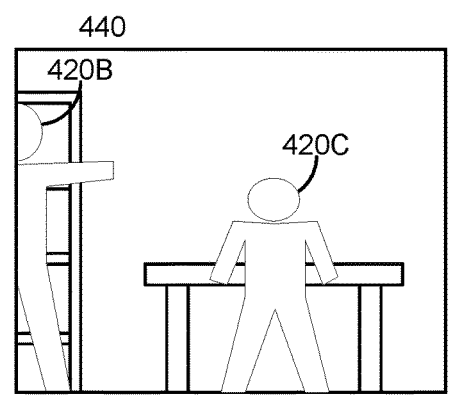
FIG. 4C illustrates an example view of the game as seen by a viewing user.

FIG. 4C illustrates an example view of the game as seen by a viewing user 130. Since the viewing user is viewing the same game play as the broadcasting user, the objects in the game play seen by the viewing user are located in the same position as the objects in the game play seen by the broadcasting user. In addition, the characters in the game play seen by the viewing user perform the same actions as the characters in the game play seen by the broadcasting user. The field of view 440 of the viewing user includes second NPC 420B and third NPC 420C. In the embodiment of FIGS. 4B and 4C, the field of view 430 of the broadcasting user 120 and the field of view 440 of the viewing user 130 both originate from the same location. In other embodiments, the field of view 430 of the broadcasting user 120 and the field of view 440 of the viewing user 130 originate from different locations. For instance, broadcasting user 120 may have a field of view originating from player character 410, and viewing user 130 may have a field of view originating from first NPC 420A. In yet other embodiment, the viewing user may freely move the rendering camera independently from the actions taken by the player or the broadcasting user. That is, the viewing user may move around a room in a video game play without been attached to the movements of a character or an object in the game. In some embodiments, the viewing user is limited to view rooms or locations that are currently loaded in the game play of the player or the broadcasting user.

Figure 5:
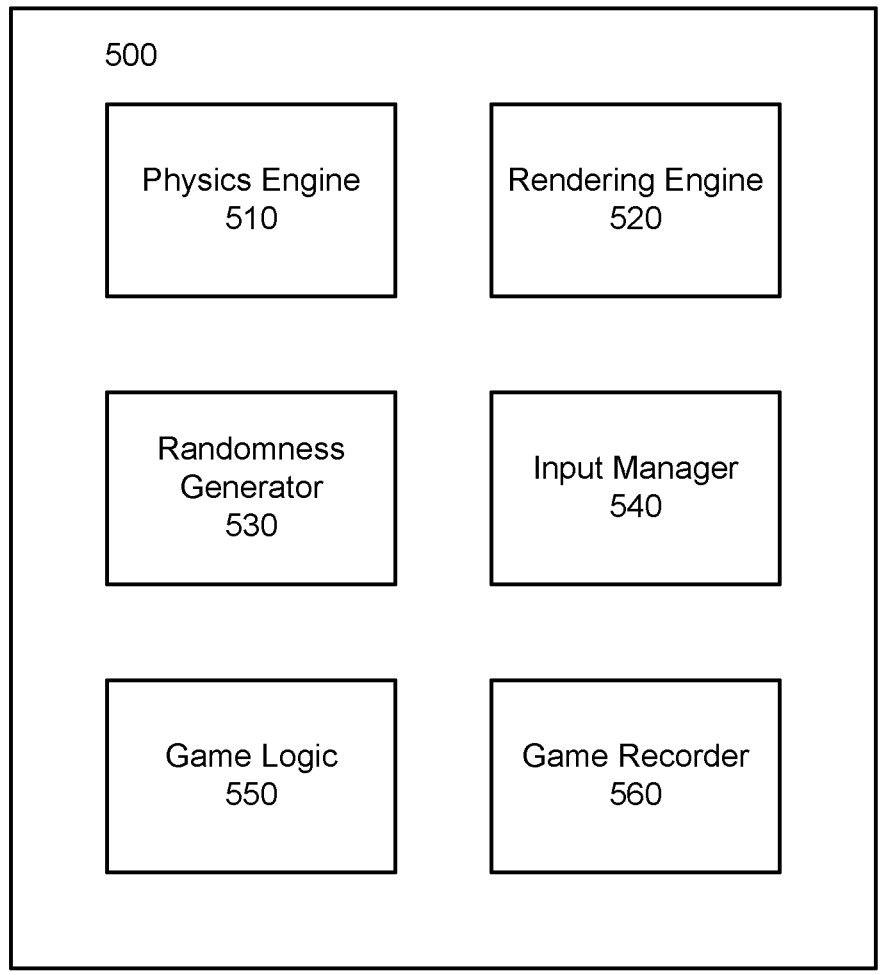
FIG. 5 illustrates a box diagram of a game engine 500, according to one embodiment.

FIG. 5 illustrates a box diagram of a game engine 500, according to one embodiment. The game engine 500 includes a physics engine 510, a rendering engine 520, a randomness generator 530, an input manager 540, and game logic 550. In some embodiments, game engines may have additional or fewer components than the ones shown in FIG. 5.

The physics engine 510 calculates physical changes happening to various objects of the game. For instance, the physics engine 510 calculates a change in position of an object falling due to the effect of gravity. In this example, to determine the change in position of the object, the physics engine 510 considers Earth's gravity, the size of the object, the weight of the object, and the viscosity of the medium the object is in. In some embodiments, the physics engine 510 runs in a loop and updates the properties (e.g., position, rotation, speed, and acceleration) of objects as often as possible. That is, after the physics engine 510 finishes calculating and updating the properties of the objects present in the game, the physics engine 510 starts the calculations for determining the changes in the properties of the objects since the properties were last determined. The physics engine 510 receives or determines the amount of time that has elapsed since the last time the properties of the objects were determined. In some embodiments, the calculation of the physics engine 510 is performed by a CPU of a client device 110. If the physics engine is configured to loop as often as possible, the frequency at which the physics engine updates the properties of the objects in the game play is dependent on the capabilities of the CPU. That is, a faster CPU may be able to loop with a greater frequency (i.e., update the properties of the objects more frequently) compared to a slower CPU. In this configuration, a faster CPU that loops thought the physics calculations more often could result in a more accurate physics calculation. For instance, the trajectory of a projectile flying though a gaseous medium can be more accurately calculated with a faster CPU that can loop though the physics calculations every 5 ms compared to a slower CPU that can only loop through the physics calculations every 20 ms.

The rendering engine 520 renders an image to be displayed to a user of a client device 110. In some embodiments, the rendering engine 520 renders a two-dimensional image of the objects present within the field of view of a player. In other embodiments, two images are rendered by the rendering engine 520 to provide a stereoscopic image. The rendering engine 520 performs shading calculations, texture mapping, fogging calculations, reflections calculations, motion blur calculations, etc.

In some embodiments, the rendering engine 520 renders images with a predetermined frequency (i.e., with a predetermined frame rate). For instance, the rendering engine 520 renders images 60 times per second (60 frames per second or FPS). In some embodiments, if the rendering engine 520 takes longer than 1 frame (1/frame rate) to render an image, the rendering engine 520 may reduce the frame rate. That is, if the rending engine 520 trying to render images with a frame rate of 60 FPS takes longer than 1/60 seconds to render each image, the frame rate may be reduced or dropped to 30 FPS. In other embodiments, the rendering engine 520 may reduce the quality of the rendering to allow for faster rending. For instance, the rendering engine 520 may reduce the resolution of the images being render or may remove shading in the images being rendered. The calculations of the rendering engine 520 may be performed by a GPU of a client device.

The randomness generator 530 is used to introduce randomness to a game. For instance, certain events, such as an enemy spotting the player's character, may occur with a specific probability. In some embodiments, the randomness generator 530 includes a pseudo-random number generator (RNG). The RNG is started from an arbitrary initial state using a seed state. In some embodiments, the RNG has a deterministic output based on the initial or seed state. That is, if the RNG is provided with the same initial or seed state, the RNG would generate the same output values. In some embodiments, the RNG can be seeded with a specific seed value. That is, the value of the initial or seed state is provided to the RNG. For instance, during a replay of a game play, the RNG can be seeded so that the RNG generates the same values as it generated during the actual game play. In other embodiments, the RNG is seeded with an arbitrary initial or seed state. For instance, the game engine 500 may generate a seed and provided the seed to the RNG. The game engine 500 may generate the seed based on a state of the computing device (e.g., based on a current time).

The input manager 540 receives inputs from the user, and provides the inputs to the game logic 550 upon request. In some embodiments, the input manager provides an indication whether the user has provided a specific input. For instance, upon request, the input manager 540 provides an indication (e.g., true or false) of whether the "X" button of a gaming controller has been pressed by the user. In other embodiments, the input manager provides the value of the input provided by the user. For example, the input manager 540 informs the game engine 550 that the user has pressed the sequence of buttons "up," "up," "down," "down," left," "right," "left," "right," "B," and "A" of a gaming controller.

The input manager 540 further stores the inputs provided by the user. In some embodiment, the received input is stored in a file. In one embodiment, the input manager 540 stores the input value, the duration of the input, and the time the input was received. In some embodiments, a location of a pointer or a cursor on the screen (e.g., the location of the user's mouse on the screen) when the inputs were provided by the user. The input manager may further store data from one or more files that are stored in the user's computer when the inputs were provided by the user. The input manager 540 may store every input provided by the user. Alternatively, the input manager 540 may only store inputs that were provided to the game logic 550. That is, a player may press buttons on a game pad during a period of time when the game engine is not responding to player input. For example, the player may press buttons while a cut scene is playing. These inputs may not be stored and instead, may be ignored by the input manager 540.

Furthermore, when the game engine 500 is reproducing a stored gameplay session or a broadcasted gameplay session of a game play, the input manager 540 reads inputs stored in a file and provides the inputs to the game logic 550 upon request. The input manager 540 provides the inputs in accordance with the information stored in the file as if a user playing the game has provided the inputs to the input manager 540.

The game logic 550 updates the objects present in the game based on inputs received from the input manager 540.

For instance, the game logic changes the direction a player's character is moving based on a directional input (e.g., up, down, left, or right). The game logic 550 additionally creates or removes objects. For instance, the game logic 550 creates more enemies as a user progresses through the game. In some embodiments, the game logic 550 may use the randomness generator 530 to introduce randomness to the game. For example, the game logic 550 uses the randomness generator to determine an initial placement of various enemies present in the game.

In some embodiments, the game logic 550 updates the field of view used by the rendering engine 520 based on inputs received from accelerometers and gyroscopes (e.g., accelerometers of a virtual reality headset). For example, when the accelerometers of a VR headset detects that a user has rotated his head to the left, the game logic 550 updates the field of view to also rotate to the left.

The game recorder 560 periodically records the position of objects present during the game play. The game recorder 560 may start recording the position of objects when the objects spawn, and may stop recording the position of the objects when the objects de-spawn. As used herein, when an object is spawned, the object is created by the game engine 500 and added to the world within the interactive content. In some embodiments, when an object is spawned, the object is further added to a list of objects to whose properties are updated by the physics engine 510. Furthermore, when an object is de-spawned, the object is removed from the world within the interactive content. Objects are spawned or de-spawned based on a variety of events. For instance, objects can be spawned or de-spawned when a user reaches a specific area of a game, or a user defeats a specific enemy. The game recorder 560 may record the position of the objects with a set frequency (e.g., every 120 frames). Alternatively, the game recorder 560 records may alter the frequency at which the position of objects are being recorded based on one or more factors, such as, the number of objects that are present in the game, and the amount of movement of the objects. In addition to recording the position of the objects, the game recorder 560 may record other properties of the objects such as rotation, velocity, and acceleration.

The game recorder 560 may only record a subset of objects that are spawned in the game. For instance, the game recorder 560 may only record the main characters of the game. In one embodiment, the position of different objects is stored with different frequencies. For instance, the position of the main character may be stored every 20 frames, and the position of other objects are stored every 60 frames.

Furthermore, when the game engine 500 is reproducing a stored gameplay session or a broadcasted gameplay session of a game play, the game recorder 560 retrieves the recorded positions of each object and moves the objects to the recorded position. When the game engine 500 of a viewing user is reproducing a stored gameplay session played by a broadcasting user, the position of an object in the viewing user's gameplay session may drift from the position the object in the broadcasting user's gameplay session. That is, the physics engine 510 of the game engine 500 of the viewing user 130 may calculate the properties of the objects in the game with a different accuracy as the physics engine 510 of the broadcasting user 120. By moving the position of the objects to the recorded positions, the game recorder 560 re-synchronizes the position of the objects to substantially match the position of the objects in the gameplay session of the broadcasting user.

Figure 6A:
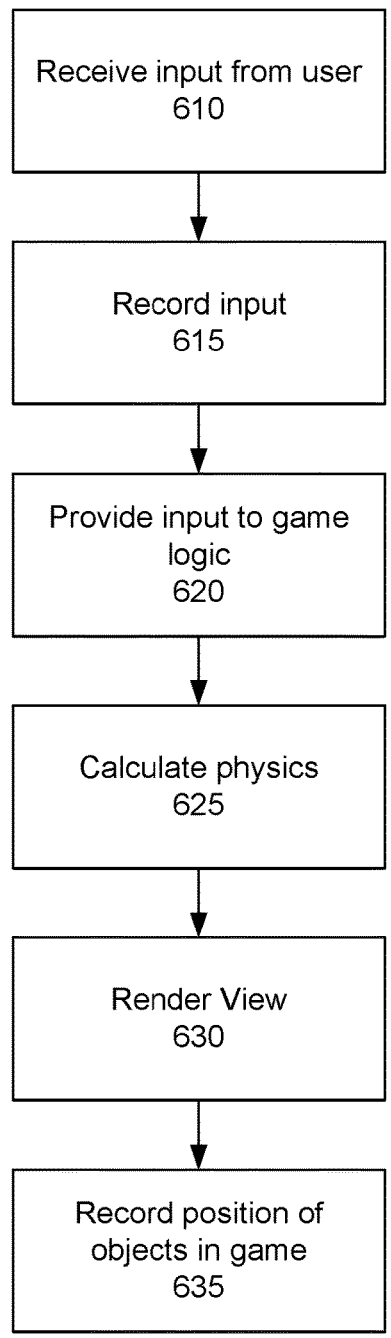
FIG. 6A is a flow diagram of a process for rendering interactive content, according to one embodiment.

FIG. 6A is a flow diagram of a process for rendering and recording interactive content, according to one embodiment. Input is received 610 from a user controlling the interactive content. For instance, input is received from a gaming controller of a user playing a game.

Upon receiving a request for an input from the game logic 550, the input manager 540 records 615 the received input and provides 420 the input to the game logic 550.

The physics engine 510 calculates 625 the physical changes for the objects currently present in the interactive content. In some embodiments, the physics engine 510 periodically calculates and updates the properties of the objects currently present in the interactive content. For instance, the physics engine 510 periodically calculates the position, velocity, and rotation of each object present in the interactive content. In other embodiments, the physics engine 510 constantly loops though the physics calculations. That is, after finishing calculating the properties of each object, the physics engine 510 re-calculates the properties of every element based on the previously calculated properties and an amount of time elapsed since the last time the properties were calculated.

The rendering engine 520 renders 630 a two-dimensional image of the objects located within the field of view of the user interacting with the interactive content. As used herein, interacting with the interactive content may be either controlling the interactive content or viewing a recorded session of the interactive content. In some embodiments, the images are rendered with a set frame rate or frequency. The rendering engine 520 may render two two-dimensional images of the objects located within the field of view of the user interacting with the interactive content to produce a three dimensional stereoscopic image.

The position of objects in the game are recorded 635. In some embodiments, the position of the objects is recorded periodically. For instance, the position of the objects may be recorded every 120 frames. The frequency at which the position of the objects is recorded may be dependent on the type of game. For instance, the position of objects may be recorded more often for an action game compared to an adventure game. In some embodiments, the position of only a subset of objects is recorded. For instance, a game may only record the position of the main character. In one embodiment, the position of different objects is stored with different frequencies. For instance, the position of the main character may be stored every 20 frames, and the position of other objects are stored every 60 frames.

In some embodiments, the recorded interactive content is provided to a viewing user and the viewing user re-renders the recorded interactive content based on the stored inputs and stored position of the objects spawned in the gameplay session. In other embodiments, the broadcasting user or a video streaming server re-renders a VR video (e.g., a 360° video or a 180° video) based on the recording. For instance, the broadcasting user or the video streaming server may render a set of images in a plurality of directions for every frame of the gameplay session. Since this rendering is not performed in real time (i.e., as the content is being controlled by the broadcasting user), the rendering time of each frame is not constrained by the frame rate. That is, if a 60 FPS video is being rendered, each frame does not need to be rendered in ⅟60 seconds.

Figure 6B:
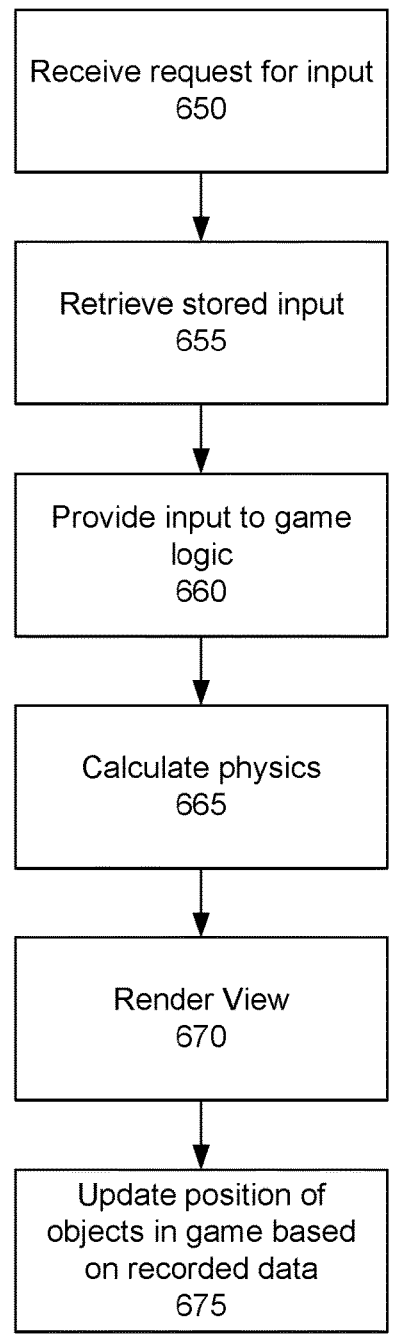
FIG. 6B is a flow diagram of a process for rendering, by a client device of a viewing user, interactive content that was controlled by a broadcasting user, according to one embodiment.

FIG. 6B is a flow diagram of a process for rendering, by a client device of a viewing user, interactive content that was controlled by a broadcasting user, according to one embodiment. A request for an input is received 650 from the game logic 550. The input manager 540 retrieves 655 one or more inputs that were provided by the broadcasting user. In some embodiments, the inputs are retrieved from a file. In other embodiments, the inputs are retrieved from a remote server.

The input manager 540 provides 660 the retrieved inputs to the game logic 550. The game logic 550 may then update objects present in the game based on the received input.

The physics engine 510 calculates 665 the physical changes for the objects currently present in the interactive content. Since the game logic 550 is provided with the same inputs that were provided by the broadcasting user 120 during the game play of the broadcasting user 120, the physics engine 510 calculates similar physical changes to the physical changes calculated by the physical engine 510 of the game engine 500 of the broadcasting user 120. In some embodiments, the physical engine 510 of the broadcasting user 120 and the physical engine 510 of the viewing user 130 calculate the physical changes with different degrees of accuracy. For instance, if the processor of the client device of the broadcasting user 120 has a different amount of computing capability than the processor of the client device of the viewing user 130, the physics engine 510 of the broadcasting user 120 may loop with a different frequency as the physical engine 510 of the viewing user 130. As such, the position of objects in the gameplay session of the viewing user 130 may drift from the position of the objects in the gameplay session of the broadcasting user 120.

The rendering engine 520 renders 670 a two dimensional image of the objects located within the field of view of the viewing user. The rendering engine 520 of the viewing user 130 may render the images using a different perspective as the rendering engine 520 of the broadcasting user. In some embodiments, the perspective used by the rendering engine 520 of the viewing user 130 is based on an input provided by the viewing user. For example, the viewing user 130, using a VR headset provides the game engine 520 an input to move the perspective used to render the images based on a movement of the VR headset. When the user rotates their head, therefore rotating the VR headset, the perspective used to render the images by the rendering engine 520 of the viewing user is rotated accordingly.

The position of objects in the interactive content is updated 675 based on a recording of the position of the objects of the interactive content controlled by the broadcasting user. The objects in the gameplay session being reproduced by the viewing user are updated to account for the drift due to mismatches in the calculations performed by the physics engine 510 of the viewing user 130 and the calculations performed by the physics engine 510 of the broadcasting user 120.

Figure 7:
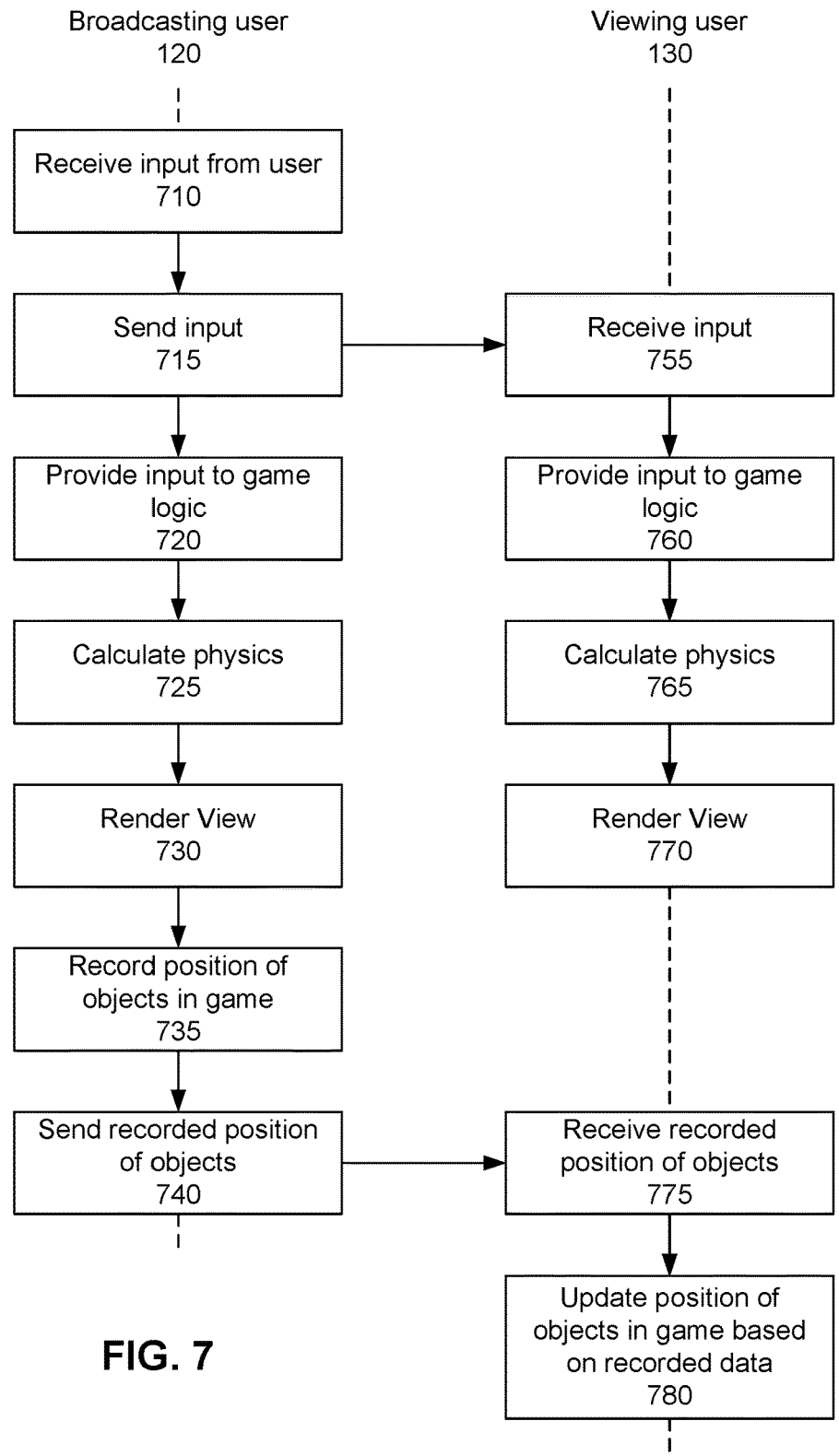
FIG. 7 is a flow diagram of a process for rendering interactive content by a broadcasting user and a viewing user, according to one embodiment.

FIG. 7 is a flow diagram of a process for rendering interactive content by a broadcasting user and a viewing user, according to one embodiment. Input is received 710 from the broadcasting user controlling the interactive content. The input manager 540 of the game engine running 500 of the client device 110A of the broadcasting user 120 sends 715 the input to a client device 110B of a viewing user 130 and provides 720 the input to the game logic 550 of the game engine 500 of the client device 110A of the broadcasting user 120. In some embodiments, the input is sent 715 to the streaming system 140 and the client device 110B of the viewing user receives the input from the streaming system 140. The input manager 540 of the viewing user 130 receives 755 the input sent by the input manager 540 of the broadcasting user 120 and provides 760 the input to the game logic 550 of the game engine 500 of the client device 110B of the viewing user 130.

The game logic 550 of the broadcasting user 120 and the game logic 550 of the viewing user 130 update their respective games based on the input provided by the input managers 540. Since the same input are provided by both the input manager 550 of the broadcasting user 120 and the input manger 550 of the viewing user 130, the game logic 550 of the broadcasting user 120 and the game logic of the viewing user 130 update their respective games in substantially identical way.

The physics engine 510 of the broadcasting user 120 calculates 725 the physical changes for the objects currently present in the interactive content running in the client device 110A of the broadcasting user 120. The physics engine 510 of the viewing user 130 calculates 765 the physical changes for the objects currently present in the interactive content running in the client device 110B of the viewing user 130. Since the interactive content running in the client device 110A of the broadcasting user 120 and the interactive content running in the client device 110B of the viewing user 130 are controlled with substantially the same inputs, they physical changes calculated by the physics engine 510 of the broadcasting user 120 and the physics engine 510 of the viewing user 130 are substantially similar. In some embodiments, due to difference in accuracy of the physical engines 510, the physical changes calculated by the physical engine 510 of the broadcasting user are slightly different than the physical changes calculated by the physical engine 510 of the viewing user. As such, the physical properties (e.g., position, velocity, and rotation) of the objects in the interactive content running in the client device 110B of the viewing user 120 may drift compared to the physical properties of the objects in the interactive content running in the client device 110A of the broadcasting user 130.

The rendering engine 520 of the broadcasting user 120 and the rendering engine 520 of the viewing user 130 render two dimensional images of the objects located within the field of view of the broadcasting user and the viewing user, respectively. The field of view of the broadcasting user 120 may be controlled by a VR/AR headset used by the broadcasting user 120, and the field of view of the viewing user 130 may be controlled by a VR/AR headset used by the viewing user 130.

The game recorder 560 of the broadcasting user 120 records 735 the position of objects in the game play of the broadcasting user 120. The game recorder 560 then sends 740 the recorded position of the objects to the viewing user 120, and the game recorder 560 of the viewing user 130 receives 774 the recorded position of the objects. The game recorder 560 of the viewing user 130 updates 780 the position of the objects in the gameplay session of the viewing user 130 based on the received recorded position of the objects in the broadcasting user's game play. Updating the position of the objects re-synchronizes the gameplay session of the viewing user 130 to the game play of the broadcasting user 120, and thus, increases the accuracy of the gameplay session being viewed by the viewing user 130.

Additional Configuration Information

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from a remote broadcasting user, an input for interacting with an interactive content;
   modifying a position of an object in the interactive content based on the received input;
   receiving, from the remote broadcasting user, a recorded position of the object in the interactive content;
   modifying the position of the object based on the received recorded position of the object;
   receiving an input from the viewing user to change a field of view for rendering images for viewing by the viewing user;
   modifying the field of view based on the received input from the viewing user; and
   rendering images of the interactive content based on positions of the objects in the interactive content and the field of view.

2. The method of claim 1, wherein a field of view for rendering images for viewing by the viewing user is independent of a field of view for rendering images for viewing by the broadcasting user.

3. The method of claim 1, wherein the recorded position of the object comprises a texture of the object.

4. The method of claim 1, further comprising:
   modifying a velocity of the object in the interactive content based on the received input;
   receiving, from the remote broadcasting user, a recorded velocity of the object; and
   modifying the velocity of the object based on the received recorded velocity of the object.

5. The method of claim 1, further comprising:
   modifying an acceleration of the object in the interactive content based on the received input;
   receiving, from the remote broadcasting user, a recorded acceleration of the object; and
   modifying the acceleration of the object based on the received recorded acceleration of the object.

6. The method of claim 1, further comprising:
   modifying a rotation of the object in the interactive content based on the received input;
   receiving, from the remote broadcasting user, a recorded rotation of the object; and
   modifying the rotation of the object based on the received recorded rotation of the object.

7. The method of claim 1, wherein the input for interacting with an interactive content is a button press performed by the remote broadcasting user.

8. The method of claim 1, wherein modifying the position of the object based on the received recorded position of the object comprises:
   synchronizing a position of the object in the interactive content with the received recorded position of the object.

9. A method for providing, to viewing by a viewing user, a playthrough of an interactive content being consumed by a broadcasting user the method comprising:
   receiving, from a broadcasting user, an input for controlling the interactive content;
   storing the received input;
   modifying a position of an object in the interactive content based on the received input;
   periodically storing one or more positions of the object in the interactive content; and
   providing the stored input and the stored one or more positions of the object to a viewing user for replaying the interactive content and rendering a plurality of images of the replay of the interactive content.

10. The method of claim 9, further comprising:
    periodically calculating changes to a plurality of physical positions of the object based on an amount of time elapsed since the physical positions of the object were last updated and a current value of the plurality of physical positions; and
    periodically updating the physical positions of the object based on the periodic calculations.

11. The method of claim 9, further comprising:
    modifying a velocity of the object in the interactive content based on the received input;
    receiving, from the broadcasting user, a recorded velocity of the object; and
    modifying the velocity of the object based on the received recorded velocity of the object.

12. The method of claim 9, further comprising:
    modifying a texture of the object in the interactive content based on the received input;
    receiving, from the broadcasting user, a recorded texture of the object; and
    modifying the texture of the object based on the received recorded velocity of the object.

13. The method of claim 9, further comprising:
    modifying an acceleration of the object in the interactive content based on the received input;
    receiving, from the remote broadcasting user, a recorded acceleration of the object; and
    modifying the acceleration of the object based on the received recorded acceleration of the object.

14. The method of claim 9, wherein the input for controlling the interactive content is a button press performed by the broadcasting user.

15. A method comprising:
    receiving, from a broadcasting user, an input for controlling the interactive content;
    storing the received input;
    modifying a position of an object in the interactive content based on the received input;
    periodically storing one or more positions of the object in the interactive content;
    replaying the interactive content based on the stored inputs;
    periodically modifying positions of the object in the replay of the interactive content based on the stored one or more positions of the object in the interactive content; and
    rendering images from a plurality of views to generate a 360° video of the replay of the interactive content.

16. The method of claim 15, wherein the stored position of the object comprises a texture of the object.

17. The method of claim 15, further comprising:
    rendering, in real-time, a second plurality of images of the interactive content being controlled by the broadcasting user; and wherein the rendering of the images to generate the 360° video is performed after the rendering of the second plurality of images.

18. The method of claim 15, further comprising:

modifying a velocity of the object in the interactive content based on the received input;

receiving, from the remote broadcasting user, a recorded velocity of the object; and modifying the velocity of the object based on the received recorded velocity of the object.

19. The method of claim 15, further comprising:

modifying a rotation of the object in the interactive content based on the received input;

receiving, from the remote broadcasting user, a recorded rotation of the object; and modifying the rotation of the object based on the received recorded rotation of the object.

20. The method of claim 15, wherein the input for controlling the interactive content is a button press performed by the broadcasting user.

* * * * *